United States Patent
Yoon et al.

(10) Patent No.: US 6,421,152 B1
(45) Date of Patent: Jul. 16, 2002

(54) OPTICAL BUFFER UTILIZING A CELL POINTER

(75) Inventors: Kyeong Mo Yoon; Yoon Hak Bang; Su Mi Chang; Jin Sik Park; Yong Ki Park; Sang Goo Lee; Sang In Kim, all of Seoul (KR)

(73) Assignee: Korea Telecom, Sungnam-shi (KR)

( * ) Notice: Subject to any disclaimer, the term of this patent is extended or adjusted under 35 U.S.C. 154(b) by 0 days.

(21) Appl. No.: 09/232,698

(22) Filed: Jan. 19, 1999

(30) Foreign Application Priority Data

Jan. 16, 1998 (KR) .............................................. 98-1167

(51) Int. Cl.[7] .......................... H04J 14/00; H04J 14/02; H04J 14/08
(52) U.S. Cl. ......................... 359/130; 359/123; 359/139
(58) Field of Search .................. 359/130, 135, 359/138, 139, 140; 365/64, 112; 369/275.1; 385/37

(56) References Cited

U.S. PATENT DOCUMENTS

| | | | |
|---|---|---|---|
| 5,625,727 A | * | 4/1997 | Liedenbaum et al. .......... 385/16 |
| 5,864,414 A | * | 1/1999 | Barnsley et al. ............. 359/125 |
| 6,163,392 A | * | 12/2000 | Condict et al. ............. 359/124 |

* cited by examiner

*Primary Examiner*—Leslie Pascal
*Assistant Examiner*—Dalzid Singh
(74) *Attorney, Agent, or Firm*—Staas & Halsey LLP

(57) ABSTRACT

The present invention relates to an apparatus of a high speed optical buffer utilizing a cell pointer so that optical cells of asynchronous transfer mode can be stored and processed at high speed without the restriction of processing time for a high speed network architecture, wherein an internal switch of the apparatus would be controlled by extracting optically the cell pointer indicating starting point by using a high speed optical buffer with terahertz optical asymmetric demultiplex (Terahetz Optical Asymmetric Demultiplexer) in order to avoid a collision of each cell which is transmitted on a same channel especially at the high speed network.

1 Claim, 5 Drawing Sheets

OPTICAL BUFFER UTILIZING A CELL POINTER

FIELD OF INVENTION

The present invention relates to an apparatus for buffering data; and, more particularly, to an apparatus for buffering data by using an optical buffer so that optical cells of asynchronous transfer mode can be stored and processed without the restriction of processing time for a high speed network.

DESCRIPTION OF THE PRIOR ART

Wavelength division multiplexing (WDM) is conventionally used for a high speed network. Recently, because of a limitation of flat-gain bandwidth of an optical fiber amplifier and a limitation of a wavelength selectivity of an optical filter for choosing a needed signal at a receiving end, a time division multiplexing (TDM) is combined with the Wavelength Division Multiplexing to increase total transmission capacity of a network. At this high speed network, a high speed optical buffer is required to avoid the collision of cells transmitted on the same channel.

With a usual optical buffer design, the information of each cell should be read by the optical buffer controllers to make decisions on buffering periods for each cell, so that the decision making electronic circuit is required indispensably. However, a limitation of processing of the electronic circuit makes such buffering difficult to use at the high speed network.

As shown in FIG. 1, wavelength of asynchronous transfer mode cells are converted in sequence at a buffer input part in order to have delays of needed periods. A cell should be converted to $\lambda 2$ at the buffer input part to be stored for the amount of one cell period. This wavelength converted cell is demultiplexed by a wavelength division demultiplexer (Wave length Division Demultiplexer). This cell, which is demultiplexed in wavelength is routed to a wavelength converter for the wavelength conversion to $\lambda 1$. For longer delay, this cell should be converted to $\lambda 3$ at the buffer input part to be stored during the amount of the two cell periods. This cell is converted to $\lambda 2$ and $\lambda 1$ by wavelength conversion for each looping, and is output after the total two cell periods (T).

As can be seen in FIG. 1, the first wavelength is output without passing the delay line, the second wavelength is output through the delay of one cell period, and the Nth wavelength is output through the delay of the N−1 cell periods.

If two cells arrive simultaneously at the said buffer input part, one cell is converted to $\lambda 1$, and the other cell is converted to $\lambda 2$. The cell converted to $\lambda 1$, does not experience the delay, however the other cell converted to $\lambda 2$ experiences the delay of one cell period.

With the buffering scheme in FIG. 1, the wavelength should be assigned sequentially on incoming packets which are wavelength multiplexed. Otherwise, there is a problem of time utilization. The reason is that time slots of the number in association associated with the vacant wavelengths cannot be used in time domain, if there are vacant wavelengths in the wavelength span of $\lambda 1 \sim \lambda n$. When $\lambda 2$ does not exist between $\lambda 1$ and $\lambda 3$, $\lambda 1$ cell is output without a delay. However, $\lambda 3$ is converted to $\lambda 2$ and experiences the delay of one cell period, then $\lambda 2$ is converted to $\lambda 1$ to be output. That is, $\lambda 2$ experiences unnecessary delay of one cell period, which causes a vacant time slot of one cell period between $\lambda 1$ and $\lambda 3$. This causes a waste for total network transmission capacity. Therefore, in order to avoid the vacant time slots of the buffer, the wavelength should be reallotted sequentially at the buffer input part. To do so, it should be known how many cells are injected through the all inlets before they arrive at the wavelength converter 1. In order to acquire this information, an electronic detection component and a processing component should be integrated in a buffer, which becomes the restriction factor of buffering capacity for every channel.

Because the buffer consists essentially of the wavelength converter utilizing a cross gain modulation (XGM), there are severe restrictions on the maximum number of wavelength conversion. Because the wavelength converter utilizing XGM has no good contrast ratio, a cell which is allotted to $\lambda n$ should undergo wavelength conversion by N−1 times, so because of the influence of an amplifier spontaneous emission (ASE) noise of a semiconductor optical amplifier (SOA) and because of the degradation of the contrast ratio, it is difficult to get a satisfied packet signal at a final output.

As shown in FIG. 2, the optical buffer utilizing a frequency division multiplexing (Frequency Division Multiplexing) method consists essentially of an optical delay loop 4, a quasi 2*2 switch 5, and a fast frequency-selective filter 6. This buffer has the function of multi-input and one-output. Multiple input packets are injected to the vacant optical delay line loop 4 at the same time. The fast frequency-selective filter 6 chooses one of the wavelength multiplexed packets which are copied for every looping in the optical delay line. Frequency division multiplexed Packets, "$\lambda A$, $\lambda B$ and $\lambda C$" are entered to the optical delay line loop 4, and are produced at the quasi 2*2 switch 5 through the optical gate Gr 8 and the optical coupler (transfer mode: Gt=open, Gc=close) 9. At the same time, the packets are injected to the optical delay line loop 4. And they are inserted to the optical delay loop through the optical gate Gc 7 and the coupler (circulate mode: Gt=close, Gc=open) at the next time slot. During a circulate mode (Circulate Mode), the loop makes two copies of the packets and stores one copy in the loop, and send the other copy to a fast frequency-selective filter.

As shown in FIG. 3, the optical delay line loop 4 transmits copies of the original packets, first. And, it produces the frequency division multiplexed packets "$\lambda A$, $\lambda B$ and $\lambda C$" which are copied two times during the three time slots. As the filter 6 continuously selects "$\lambda A$, $\lambda B$ and $\lambda C$", packets with the same wavelength sequence transmits the frequency division multiplexing buffer.

As described above, in order to select one packet out of the copies of wavelength division multiplexed packets, one of the optical gates of the fast frequency-selective filter should be opened for one time slot, then be closed promptly. However, in order to control this, it is difficulty to acquire the information that what wavelengths are multiplexed and injected. Furthermore, in order to detect the injected wavelengths, good amount of electronic signal processing component should be integrated to a buffer, so the processing speed per channel is restricted.

When N packets multiplexed with N wavelengths come to the buffer, they should be copied by N times through the optical delay line loop 4, so there are loss related problem. Even the semiconductor optical amplifier (SOA) and the filter are inserted at optical delay line loop 4 to reduce the noise accumulation, it can not store packets indefinitely because of the amplifier spontaneous emission (ASE) noise.

SUMMARY OF THE INVENTION

It is, therefore, an object of the present invention to provide an apparatus for buffering data by using an optical buffer utilizing a cell pointer so that optical cells of asynchronous transfer mode can be stored and processed at high speed without the restriction of processing time for a high speed network, wherein an internal switch of the apparatus would be controlled by extracting optically the cell pointer indicating a starting point of a cell by using terahertz optical asymmetric demultiplex (Terahertz Optical Asymmetric Demultiplexer) in order to avoid a collision of each cell which is transmitted on a same channel especially at the high speed network.

In accordance with the present invention, there is provided an apparatus comprises: a 1*N arrayed waveguide grating (AWG) demultiplexer that separates the simultaneously incoming wavelengths at the input part of the high speed optical buffer, a terahertz optical asymmetric demultiplexer (Terahertz Optical Asymmetric Demultiplexer) which detects the cell pointer of each wavelength channel divided at 1*N AWG demultiplexer at high speed, a circulator which circulates data reflected at Terahertz Optical Asymmetrical Demultiplexer, a 1*2 switch that routes the data, which is injected from the circulator to a no-delay path, or routes the data to a no-delay path with the delay time of T period in accordance with the existence or non-existence of cell pointer detected by a Terahertz Optical Asymmetrical Demultiplexer, and an optical coupler that combines data selected at Terahertz Optical Asymmetrical demultiplexer with data which are transmitted directly or with the delay time at the 1*2 switch.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
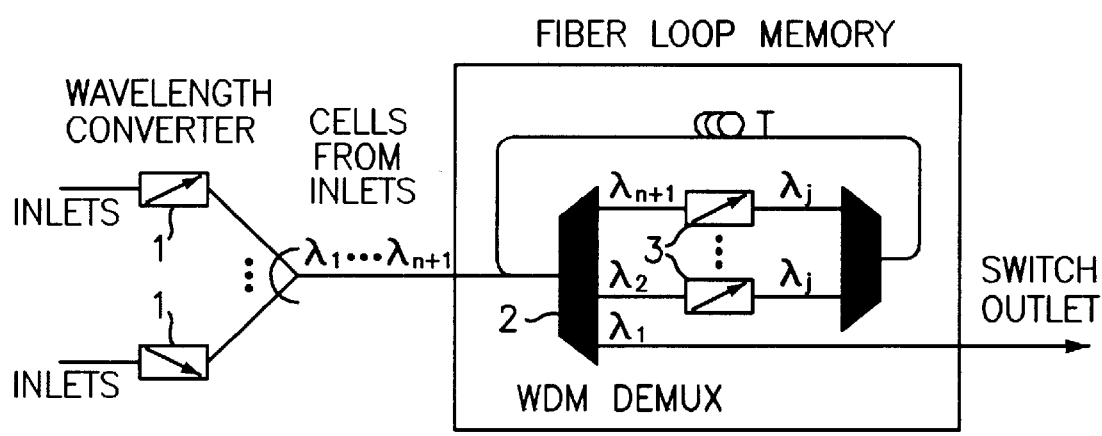
FIG. 1 represents a schematic block diagram of an optical buffer utilizing a conventional electric-light wavelength converter.
Figure 2:
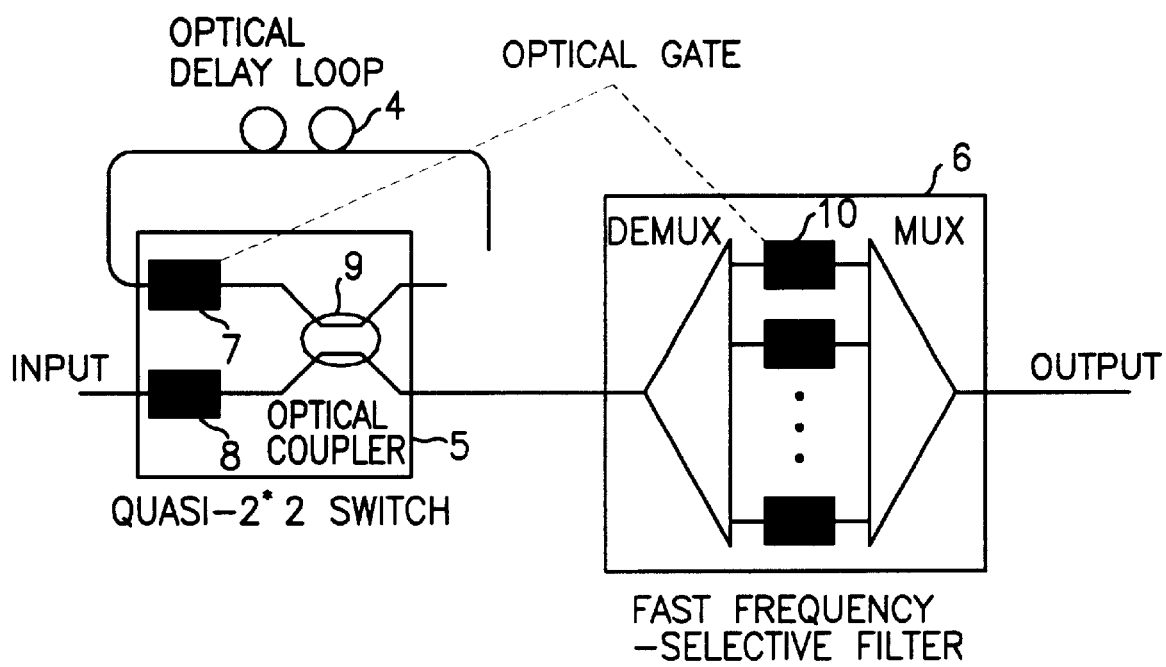
FIG. 2 illustrates a schematic block diagram of a conventional frequency division multiplexing loop optical buffer.
Figure 3:
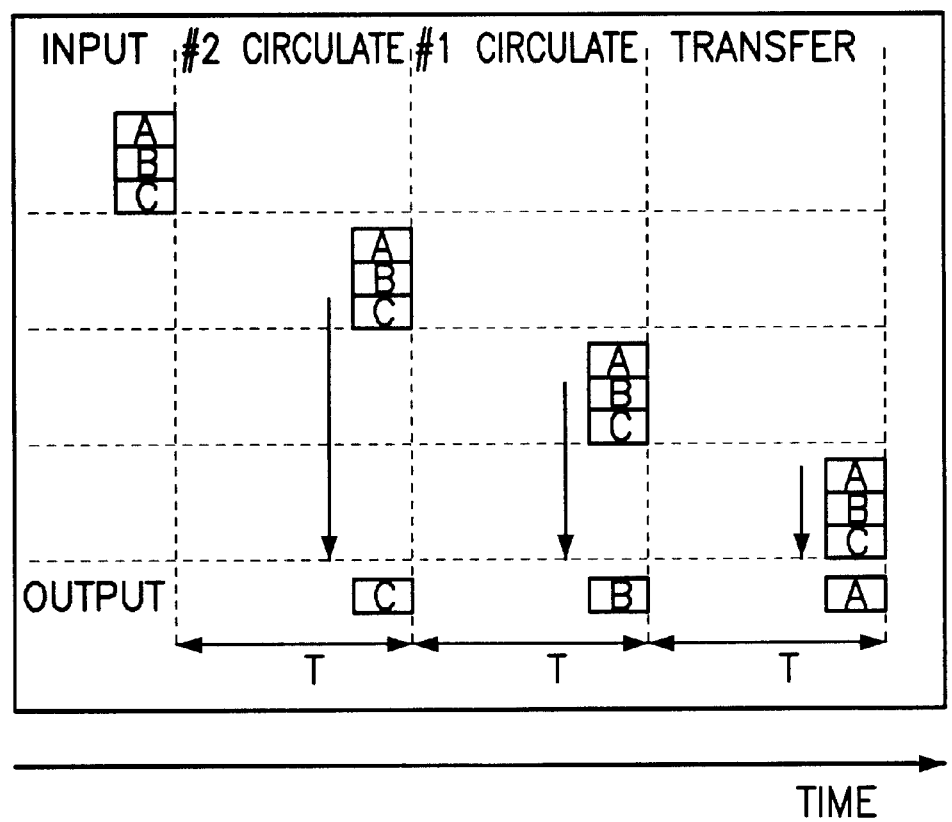
FIG. 3 describes a timing chart of the optical buffer shown in FIG. 2.
Figure 4:
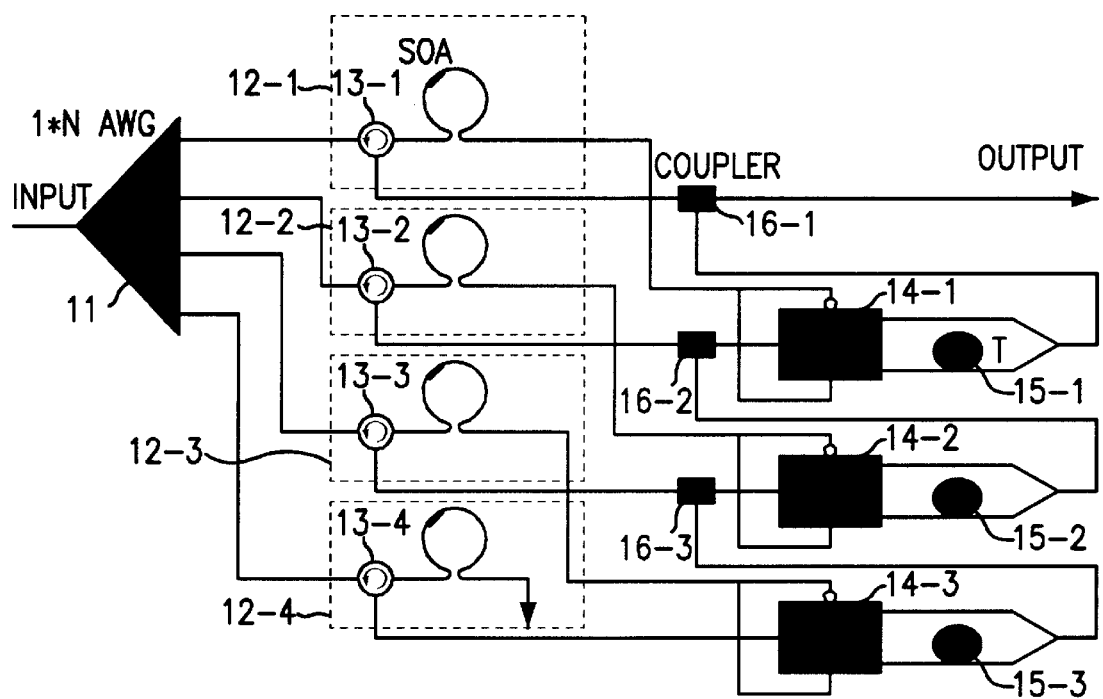
FIG. 4 shows a detailed schematic block diagram of an optical buffer utilizing a cell pointer in accordance with the present invention.
Figure 5:
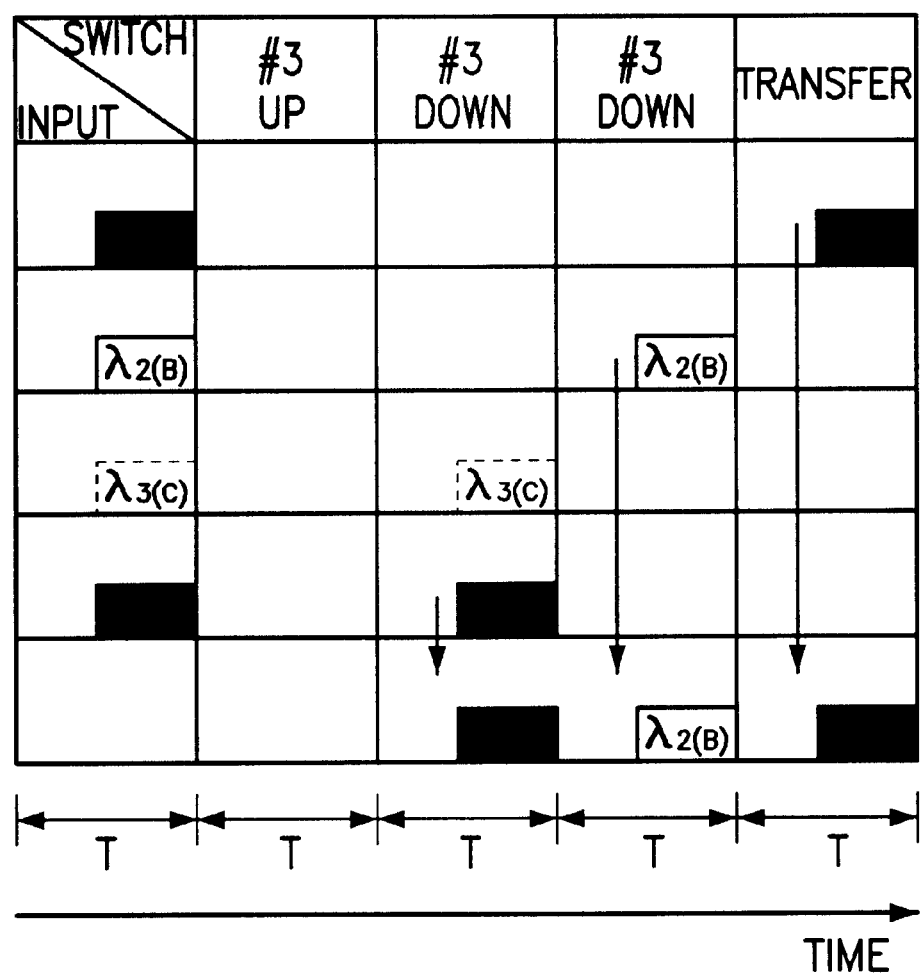
FIG. 5 provides a timing chart of the optical buffer in accordance with the present invention.

The present invention is explained in detail as the following in association with the drawings. FIG. 4 is an optical buffer utilizing a cell pointer in accordance with the present invention. The present invention refers to an apparatus that consists essentially of components which are introduced as follows: a 1*N arrayed waveguide grating (AWG) demutiplexer 11, wherein the simultaneously incoming wavelengths are separated at an input part of the high speed optical buffer; terahertz optical asymmetric demutiplexers (Terahertz Optical Asymmetric Demultiplexers) 12-1~12-4, wherein cell pointers of each wavelength channels separated at the 1*N AWG demultiplexer 11 are detected at high speed; circulators 13-1~13-4, wherein data reflected at Terahertz Optical Asymmetrical Demultiplexer 12-1~12-4 are circulated; 1*2 switches 14-1~14-3, wherein the data injected from a circulator (13-1~13-4) is routed to a path without delay or to a path with delay of time T period through a delay line 15-1~15-3 by switching in response to existence or non-existence of the cell pointer detected at the Terahertz Optical Asymmetrical Demultiplexer 12-1~12-4; and optical couplers 16-1~16-3, wherein the data reflected at Terahertz Optical Asymmetrical Demutiplexer 12-1~12-4 are combined with the data transmitted without delay or transmitted with the delay time at the 1*2 switch 14-1~14-3. FIG. 5 is a timing chart of the optical buffer, which provides a transmitting status and an operating status of a switch of the optical buffer for each wavelength channel.

For asynchronous transfer mode cells which are wavelength multiplexed on the same time-axis and injected. The waves $\lambda 1$~$\lambda 4$ are divided through the 1*N AWG demultiplexer. And it is supposed that the wavelength separated asynchronous transfer mode cells of the divided wavelengths $\lambda 1$~$\lambda 4$ have a bit which acts as a cell pointer in the front part of each asynchronous transfer mode cell. By utilizing a cell pointer, it can minimize the electronic control unit for switching which allows a buffer operating effectively even at 100 Gbits/sec.

When the cell pointer of the asynchronous transfer mode cells of the waves $\lambda 1$~$\lambda 4$ divided from the 1*N AWG demultiplexer 11 are detected through the Terahertz Optical Asymmetric Demultiplexer 12-1~12-4, the operation speed which is higher than 100 Gbit/s is possible, and the demultiplexing can be performed bit by bit, because the demultiplexing is done by using the fast rising edge of an optical nonlinearty during saturation process in a semiconductor optical amplifier (Semiconductor Optical Amplifier) of the Terahertz Optical Asymmetric Demultiplexer (12-1~12-4). Hereby, the Semiconductor Optical Amplifier should have the characteristics that the gain recovery time after a saturation is preferred to be long. Because the energy of the pulse for the saturation of the Semiconductor Optical Amplifier should be hundreds of femto-Joules, the cell pointer has higher energy compared to the data pulse. If the cell pointers are injected at the Terahertz Optical asymmetrical Demultiplexer, these incident cell pointers are divided to a clockwise (CW) pulse and a counter clockwise (CCW) pulse, at first the clockwise pulse goes through the Semiconductor Optical Amplifier and saturates the Semiconductor Optical Amplifier. Here, the clockwise pulse does not suffer the cross phase modulation at the Semiconductor Optical Amplifier.

After the saturation of the Semiconductor Optical Amplifier by the clockwise pulse, the counter clockwise pulse comes in, which experiences the Π phase change caused by the saturation.

When the above two pulses are combined together again, while the destructive interference occurs at the input part, the constructive interference occurs at the output part, so the cell pointers goes out to the opposite direction where they were entered. As for the data pulse which follows the cell pointer, because of the long gain recovery time, both the clockwise data pulse and the counter clockwise data pulse suffer the same amount of phase change in the Semiconductor Optical Amplifier, and they goes out again to the input port in contrast with the cell pointers. Therefore, the data, which is reflected to the input port, is entered to the 1*2 switch through the circulator 13-1~13-4. The cell pointers, which go out to the output port, is used as the control signals for the 1*2 switch.

As for the asynchronous transfer mode cells which are wavelength multiplexed and injected to the buffer, all available wavelengths can be injected simultaneously, or only one wavelength cell can be injected. In any case, the asynchronous transfer mode cells, which are wavelength multiplexed are converted to the serial signals which have the closely packed cells of different wavelength on a time-axis. The signal of the last wavelength does not make the vacant time slot on the time-axis, even if the wavelength in the middle is empty. It is located right next to the time slot of the wavelength whose next wavelength is empty.

As shown in FIG. 5, the $\lambda 1$ wavelength cell, which went through the 1*N AWG demultiplexer 11 and the Terahertz Optical asymmetrical Demultiplexer, does not experience the delay and is output immediately. The cell pointer selected from the $\lambda 1$ wavelength cell activates the 1*2 switch and decides whether the data, which has $\lambda 2$ wavelength, should be delayed by amount of T period of the delay line or not be delayed. If there is no data of $\lambda 1$ wavelength, the cell pointer can not be selected, so the upper part of the 1*2 switch becomes on (ON) status, then the data of $\lambda 2$ wavelength does not go through the delay line 15-1 and is transmitted immediately through the optical coupler 16-1. On the other hand, if there exist a data of $\lambda 1$, the cell pointer makes the lower part of the 1*2 switch ON status, so the data experiences the delay of T period through the delay line 15-1 and is transmitted. The cell pointer of $\lambda 2$ makes the lower part of the 1*2 switch ON, and the data of $\lambda 3$ experiences the delay of T period and is transmitted. In this case, the data of $\lambda 3$ goes through the 1*2 switch 14-2 and the 1*2 switch 14-1, so the 1*2 switch 14-1 has to keep its switching status until the last wavelength cell passes through out.

When the wavelength multiplexed cell with a large wavelength difference, such as $\lambda 1$ and $\lambda 10$ arrive the buffer, the wavelengths are divided at the 1*N AWG 11. The cell, which has this divided $\lambda 1$ wavelength, does not experience a delay and is transmitted immediately. The cell pointer selected from this $\lambda 1$ wavelength cell makes the lower part of the 1*2 switch ON status, and gives the delay of T period through the delay line 15-1 to the cells which have to go through this switch. Because there is no cell pointer for the next 1*2 switch 14-2, the data of $\lambda 10$ arrives the 1*2 switch 14-2 without delay, and experiences the only delay of T period given through the delay line 15-2 and is transmitted.

As described above, the present invention relates to the apparatus of the optical buffer utilizing a cell pointer so that the cells of the asynchronous transfer mode can be buffered at high speed without the restriction of buffering time for a high speed network architecture, wherein the internal switch of the apparatus would be controlled by optically extracting the cell pointer which indicates the starting point by using the terahertz optical asymmetric demultiplexer (Terahertz Optical Asymmetric Demultiplexer) in order to avoid a collision of cells which are transmitted on a same channel especially at the high speed network; wherein the apparatus reduces the requirements of the electronic device simplifying the control logic and offers a effective way of storage for compressed asynchronous transfer mode cells during their expansion process.

While the present invention has been described with respect to certain preferred embodiments only, other modifications and variations may be made without departing from the sprit and scope of the present invention as set forth in the following claims.

What is claimed is:

1. An apparatus for buffering data by using an optical buffer utilizing a cell pointer comprising:

a) a 1*N arrayed waveguide grating demultiplexer wherein injected wavelengths are divided on a same time-axis from an input part of a high speed optical buffer;

b) a terahertz optical asymmetrical demultiplexer equipped with a semiconductor optical amplifier, wherein the cell pointer of the demultiplexed wavelength cell at the 1*N arrayed waveguide grating demultiplexer is extracted;

c) a circulator, wherein a data reflected at the Terahertz Optical Asymmetrical Demultiplexer is circulated;

d) a 1*2 switch, wherein the data from the circulator is routed to paths with and without delay line in response to existence or non-existence of the cell pointer detected at the Terahertz Optical Asymmetrical Demultiplexer; and e) an optical coupler, wherein the data cell selected at the Terahertz Optical Asymmetrical demultiplexer are combined with the data cells which are transmitted without delay or transmitted with a delay.

* * * * *